United States Patent
Sokolihs

(10) Patent No.: US 8,696,232 B2
(45) Date of Patent: *Apr. 15, 2014

(54) STRUCTURAL UNIT WITH AXIAL ADJUSTMENT LIMITING ELEMENTS

(75) Inventor: Dirk Sokolihs, Bramsche (DE)

(73) Assignee: ZF Friedrichshafen, Friedrichshafen (DE)

( * ) Notice: Subject to any disclaimer, the term of this patent is extended or adjusted under 35 U.S.C. 154(b) by 134 days.

This patent is subject to a terminal disclaimer.

(21) Appl. No.: 12/989,122

(22) PCT Filed: Apr. 7, 2009

(86) PCT No.: PCT/DE2009/050019
§ 371 (c)(1),
(2), (4) Date: Oct. 22, 2010

(87) PCT Pub. No.: WO2009/129808
PCT Pub. Date: Oct. 29, 2009

(65) Prior Publication Data
US 2011/0038665 A1 Feb. 17, 2011

(30) Foreign Application Priority Data
Apr. 25, 2008 (DE) .......................... 10 2008 001 381

(51) Int. Cl.
*F16B 3/00* (2006.01)
(52) U.S. Cl.
USPC .......................... 403/315; 403/46; 280/93.511
(58) Field of Classification Search
USPC .......... 403/315, 316, 320, 43–48; 280/93.511
See application file for complete search history.

(56) References Cited

U.S. PATENT DOCUMENTS

| | | | | |
|---|---|---|---|---|
| 3,829,824 A | * | 8/1974 | Pillischafske | 439/758 |
| 3,876,316 A | * | 4/1975 | Sandovist | 403/44 |
| 4,097,163 A | * | 6/1978 | Dubuque | 403/274 |
| 5,156,482 A | * | 10/1992 | Owings | 403/43 |
| 5,251,995 A | * | 10/1993 | Chi | 403/320 |
| 5,286,133 A | * | 2/1994 | Wood | 403/290 |
| 6,435,776 B2 | * | 8/2002 | Vickars et al. | 405/239 |
| 6,579,025 B1 | | 6/2003 | Sokolihs et al. | |
| 6,595,714 B2 | * | 7/2003 | Moore | 403/322.2 |
| 6,698,969 B2 | | 3/2004 | Paduano et al. | |

(Continued)

FOREIGN PATENT DOCUMENTS

| | | |
|---|---|---|
| DE | 77 32 250 | 2/1978 |
| DE | 199 00 264 A1 | 7/2000 |
| DE | 102 11 066 A1 | 9/2002 |
| FR | 2 649 062 A1 | 1/1991 |

*Primary Examiner* — Daniel P. Stodola
*Assistant Examiner* — Jonathan Masinick
(74) *Attorney, Agent, or Firm* — Davis & Bujold, PLLC; Michael J. Bujold

(57) ABSTRACT

A structural unit having a tube (2) which is provided on at least one end with an internal thread (1) which is formed in a first direction of rotation. An adjustment sleeve (3) is screwed into the first end of the internal thread (1) of the tube (2), and the adjustment sleeve (3) has an internal thread (4) which is formed in the opposite direction to the first direction of rotation, and a shank (5) is screwed into the adjustment sleeve (3) and an adjustment travel of the shank (5) is limited by a blocking element (6). The adjustment sleeve (3) supports the blocking element (6) which is located within a groove (7), formed on the outer lateral surface of the shank (5), so as to limit adjustment travel over a range of motion.

11 Claims, 2 Drawing Sheets

(56) References Cited

U.S. PATENT DOCUMENTS

| | | | |
|---|---|---|---|
| 6,902,325 B1 * | 6/2005 | Uchman | 384/544 |
| 6,902,341 B1 * | 6/2005 | Rauschert | 403/43 |
| 6,966,567 B2 * | 11/2005 | McLaughlin | 280/93.51 |
| 7,073,296 B2 * | 7/2006 | Gregory et al. | 52/157 |
| 8,506,199 B2 * | 8/2013 | Rump et al. | 403/43 |
| 2002/0136596 A1 * | 9/2002 | Mouro | 403/316 |
| 2008/0034708 A1 * | 2/2008 | Pervan | 52/792.11 |

* cited by examiner

STRUCTURAL UNIT WITH AXIAL ADJUSTMENT LIMITING ELEMENTS

This application is a National Stage completion of PCT/DE2009/050019 filed Apr. 7, 2009, which claims priority from German patent application serial no. 10 2008 001 381.1 filed Apr. 25, 2008.

FIELD OF THE INVENTION

The invention relates to a structural.

BACKGROUND OF THE INVENTION

DE 199 00 264 A1, for example, describes a structural unit of a tie rod for a motor vehicle having a tube provided on at least one side with an inner thread which turns in a first direction of rotation, where an adjustment sleeve that has a corresponding outer thread is screwed into the end of the tube. A shank of a ball joint is screwed into this adjustment sleeve. For this purpose, the shank has an outer thread, which turns in the direction opposite to the first direction that corresponds to the inner thread of the adjustment sleeve. By moving the adjustment sleeve, which has a key surface for attaching a tool for this purpose, the tube and the shank can be moved relative to each other in the axial direction. This means that by rotating the adjustment sleeve, the tube and the shank are moved either towards each other or away from each other. This condition is brought about by the threads that progress in opposing directions. With this adjustment, the structural unit can undergo an axial length adjustment, relative to the common longitudinal central axis of the tube, the adjustment sleeve and the shank, which is of particular significance in the example represented in the document of a tie rod for a motor vehicle for adjusting the wheel alignment of the vehicle. However, the use of an adjustment sleeve between the tube and the shank makes it is necessary to provide two different thread diameters. This causes the force introduced via the key surface to adjust the components relative to each other to be further transferred from the ball joint to the tube via threads of different diameters. Consequently, the smaller diameter thread represents a weak point which could lead to failure with such a tie rod. Beyond this, a further disadvantage with such solutions turns out to be that the shank is inadvertently turned so far out of the adjustment sleeve that receives it that only a small section of thread is available for the transfer of force, or that the shank is even completely removed from the adjustment sleeve. This risk is additionally increased by damaged threads.

In order to prevent unscrewing the shank too far out of the adjustment sleeve, DE 77 32 250 U1 specifies a solution that limits the axial adjustment travel of the tube relative to the shank. The structural unit presented in this document that is built similarly to the previously described tie rod also makes possible the adjustment of the adjustment sleeve via a key surface present for this purpose so that the shank and the tube can be moved relative to each other in the axial direction. However, a special feature of this embodiment is that the threaded connection usually present at the tie rod for fixing the structural unit is used here to fasten a blocking element to the tie rod. The blocking element in the present example is comprised of a metal strip that has a bent end section. This bent end section rests on a planar surface at the shank designed for this purpose. Viewed in the extraction direction of the shank, it further has a groove in which the bent end section of the metal engages when the shank is loosened out of this threaded connection beyond a permissible axial displacement travel. Although the solution described in the document makes possible expedient limiting of the axial travel during adjustment of the structural unit, the manufacturing expenditure for producing the planar surface at the shank is a disadvantage. In addition, this variant embodiment involves a significant assembly expenditure. A further disadvantage is that the metal strip is located outside of the tie rod, and therefore, damage or deformation to the metal strip during the intended use of the tie rod in motor vehicles cannot be excluded so that its function could possibly be negated. In addition, this sheet metal section is subject to increased environmental influences, and therefore there is a risk of it corroding or wearing prematurely.

Furthermore, DE 102 11 066 A1 discloses a structural unit for a tie rod of a motor vehicle having a tube provided with an inner thread in a first direction of rotation, into one end of which an adjustment sleeve is screwed. The adjustment sleeve has an inner thread in the opposite direction of rotation to the first direction of rotation with a shank screwed therein, whose adjustment travel is limited by a blocking element, assigned to the adjustment sleeve, penetrated by the shank.

SUMMARY OF THE INVENTION

The technical object of the invention is to provide a structural unit having two structural elements that are adjustable relative to each other, which makes it possible to limit the axial adjustment travel, and that is reliable and simple to produce.

A structural unit having a tube provided on at least one end with an internal thread which turns in a first direction of rotation, into which an adjustment sleeve is screwed, the adjustment sleeve having an internal thread which turns in the opposite direction to the first direction of rotation and into which a shank is screwed, the adjustment travel of which is limited by a blocking element, the adjustment sleeve having a blocking element penetrated by the shank, has been further developed according to the invention in that the blocking element is held axially movable within limits in a groove present in the outer lateral surface of the shank.

With the solution according to the invention, an undesired loosening of the individual parts of the presented structural unit can be securely and reliably avoided. The available, limited axial adjustment travel of the structural components relative to each other is defined by this embodiment in a simple manner. Due to the fact that the shank penetrates the blocking element, the blocking element can be disposed within the structural unit. Consequently, the blocking element is protected from mechanical, thermal and chemical influences, thereby representing a reliable protection which is guaranteed for the entire service life of the structural unit. However, the solution according to the invention also has further advantages, such as the avoidance of an improper adjustment movement of the structural unit, or the simple construction of the structural unit. The product can be accepted directly into already existing series products without significant expenditure.

A first and particularly simple embodiment of the invention provides that the groove is implemented circumferentially along the outer lateral surface of the shank. This variant represents a particularly simple production possibility. Along with a circumferential groove, solutions in which the groove is introduced only in a part of the circumference of the outer lateral surface of the shank also lie within the scope of the inventive idea.

The blocking element should preferably be inserted into a groove introduced in the inner lateral surface of the adjustment sleeve. Thus, the adjustment sleeve together with the blocking element can be produced as a preassembled structural unit before the final assembly of the structural unit according to the invention. The overall assembly is thereby simplified.

A further development of this solution consists of inserting the blocking element without axial play into the groove in the inner lateral surface of the adjustment sleeve, but with clearance in the radial direction. The radial play within the groove for receiving the blocking element makes it possible to use the inherent elasticity of the blocking element which is significant for the assembly of the structural unit.

Corresponding to a further development of the invention, this inherent elasticity is advantageous according to the invention because the blocking element has a through opening whose clearance width corresponds to the outer dimensions of the groove of the shank. As a result, in the assembled structural unit, the surface of the through opening of the blocking element abuts the surface of the groove of the shank. Hence, an axial mobility is given within the groove in order to define the adjustment travel of the structural unit. Therefore, during the adjustment movement, the through opening of the blocking element glides along the groove of the shank.

In order to simplify the assembly of the structural unit according to the invention, it is proposed that the shank has a mushroom-cap-shaped end piece, and that the outer dimensions of this end piece are greater than the clearance width of the through opening of the blocking element. In this context, it becomes apparent that the blocking element should have an inherent elasticity. During the assembly of the structural unit, the shank with its mushroom-cap-shaped end piece is inserted into the through opening of the blocking element which, due to its inherent elasticity, consequently widens in the radial direction within the groove of the adjustment sleeve and can be guided over the mushroom-cap-shaped end piece of the shank. After moving beyond the mushroom-cap-shaped end piece of the shank, the blocking element, due to its inherent elasticity, contracts so that it has approximately a through opening which corresponds to the extent of the outer lateral surface of the groove within the shank. Thus, the blocking element now rests in the groove of the shank directly at the surface of the groove. The groove of the shank has two lateral contact flanges that limit the axial adjustment travel of the structural unit. The contact flanges serve as a stop for the blocking element.

The mushroom-cap-shaped embodiment of the end piece of the shank can be formed such that the end piece of the shank has a spherical, conical or tapered contour. It is only important in this context that the outer dimensions of the shank expand from its end toward the groove so that, due to its inherent elasticity, the blocking element guided over the end piece experiences an expansion of its through opening when the structural unit is assembled. The groove of the shank, into which the blocking element subsequently engages, is located behind the mushroom-cap-shaped end piece.

In a known manner, the adjustment sleeve can further have a key surface on its outer, free side extending out of the tube for attaching a tool. This key surface is consequently used to adjust the structural unit in that rotational movement is transferred to the adjustment sleeve, which due to the threads running in opposite directions, causes movement towards the tube or away from the tube relative to the shank.

A possible application of the structural unit according to the invention consists in that the structural unit is a component of a tie rod for motor vehicles, and the shank accordingly is the end of a ball joint-housing shank of this tie rod. According to one such application, the initially discussed advantage is evident in that the solution according to the invention can be directly transferred into an ongoing series product without significant additional expenditures. In the case of tie rods already in use that were explained in connection with the documents for the prior art, the tube, adjustment sleeve and shank components are already present. It is only necessary to provide a groove in the shank, to form the mushroom-cap-shaped end piece, and to introduce a groove into the inner sleeve of the structural unit into which the blocking element according to the invention can then be inserted. With these few changes, the structural unit according to the invention can be directly used for numerous applications.

BRIEF DESCRIPTION OF THE DRAWINGS

The invention is described in the following in more detail based on the drawings. The example embodiment shown does not limit the invention to only the variant shown, but rather serves merely for explaining the principle of the invention. In order to be able to illustrate the function according to the invention, only very simplified schematic representations are shown in the figures in which components that are not essential to the invention have been omitted. This does not imply, however, that such components would not be present in a solution according to the invention.

They show:

FIG. 1A: A diagrammatic view of an enlarged detail of a structural unit according to the invention.

DETAILED DESCRIPTION OF THE PREFERRED EMBODIMENTS

Figure 1:
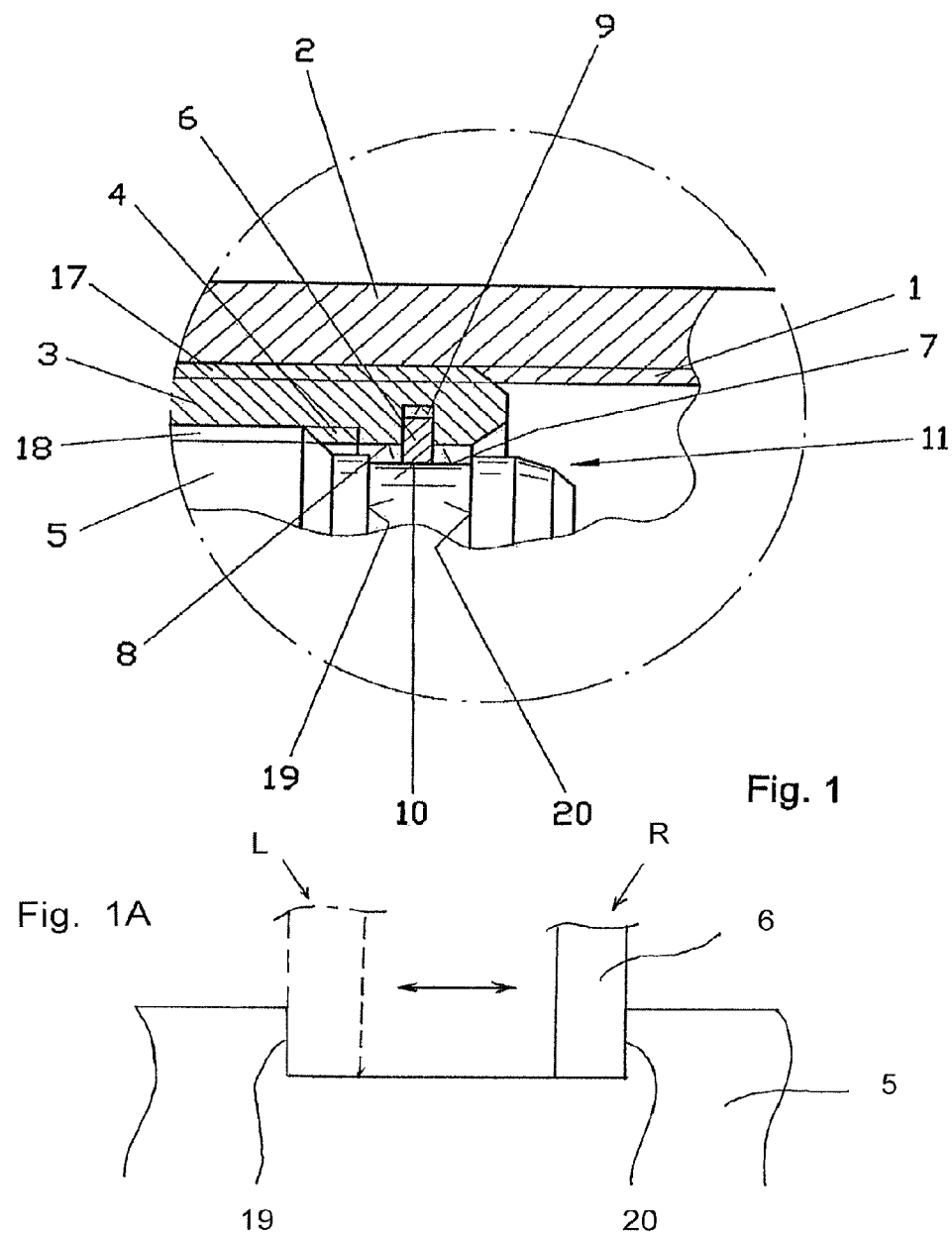
FIG. 1: A section of an enlarged representation of a structural unit according to the invention with the example of a tie rod for motor vehicles.

The enlarged representation of the structural unit according to the invention shown in section in FIG. 1 represents a component part of a tie rod for a motor vehicle. Here, FIG. 1 corresponds to the detail I in FIG. 2.

The structural unit shown has a tube 2 with an inner thread 1. An adjustment sleeve 3, with an outer thread 17 present at the adjustment sleeve 3 corresponding to the inner thread 1 of the tube 2, is screwed in to this inner thread 1. On its inner lateral surface 8, the inner sleeve 3 has an inner thread 4 which serves for screwing a shank 5 into the adjustment sleeve 3. The shank 5 on its outer lateral surface has an outer thread 18 for this purpose. It is significant for the embodiment of the invention that the inner thread 1 of the tube 2 and the inner thread 4 of the adjustment sleeve 3 are respectively threads implemented running in opposite directions to each other. If, for example, the inner thread 1 of the tube 2 is implemented as a right-hand thread, then the inner thread 4 of the adjustment sleeve 3 is implemented as a left-hand thread. Consequently, during a rotational movement of the adjustment sleeve 3 about the common longitudinal central axis A of the structural unit tube 2, adjustment sleeve 3 and shank 5, the shank 5 can be moved relative to the tube 2. As a result, an axial adjustment movement of the tie rod is possible. In its end, the adjustment sleeve 3 further has a groove 9 into which a blocking element 6 with limited elasticity is inserted. The blocking element 6 can deviate in a radial direction within the groove 9. An axial mobility of the blocking element 6 within the groove 9 is not provided. Therefore, both of the side surfaces of the blocking element 6 abut the corresponding limiting surfaces of the groove 9. Furthermore, a groove 7 is introduced into the shank 5; this groove is located in the area of the end section of the shank 5. This groove 7 is limited on both sides by a bearing flange 19 and 20, respectively. The area between the bearing flanges 19 and 20 represents the maximum possible adjustment travel of the structural unit according to the invention. The blocking element 6 further has a through opening 10 whose inner surface rests directly on the outer surface of the groove 7 of the shank 5. As shown in FIG. 1A, sliding movement of the blocking element 6 in the axial direction within the groove 7 is guaranteed to be available between the bearing flanges 19 and 20 which serve as a stop for the blocking element so as to limit axial travel of the structural unit. The blocking element slides axially between two end positions R, L (represented in FIG. 1A) in which the blocking element abuts the bearing flanges 19 and 20, respectively. It is further significant for the solution according to invention that the end piece 11 of the shank 5 is implemented having a mushroom cap shape. In the example in FIG. 1, the mushroom-cap-shaped contour of the end piece 11 of the shank 5 is attained by a plurality of geometries merging into one another. Thus, starting at the end of the shank 5, two cone-shaped geometries with different gradients towards the longitudinal central axis alternate. Connecting to the cone-shaped geometries of the end piece 11, the end piece has a cylindrical cross-section which transitions on the groove side into the stopping flange 20.

The assembly of the structural unit occurs as follows:

First, the individual parts are manufactured. Next, the blocking element 6 is inserted into the groove 9 provided for this purpose in the adjustment sleeve 3. The blocking element 6 has an inherent elasticity which, while screwing the shank 5 into the adjustment sleeve 3, makes it possible to first guide the mushroom-cap-shaped end piece 11 of the shank 5 through the through opening 10 of the blocking element 6. Due to the mentioned inherent elasticity, in the process, the blocking element 6 expands in the radial direction in the groove 9. It slides with its through opening 10 along the cone-shaped geometries of the end piece 11. After the mushroom-cap-shaped end piece 11 has been passed, the blocking element 6 engages in the groove 7 of the shank 5 and contracts due to its inherent elasticity such that it rests on the surface of the groove 7. Now, the partial structural unit created in this manner can be screwed into the inner thread 1 of the tube 2 using the outer thread 17 of the adjustment sleeve 3.

Figure 2:
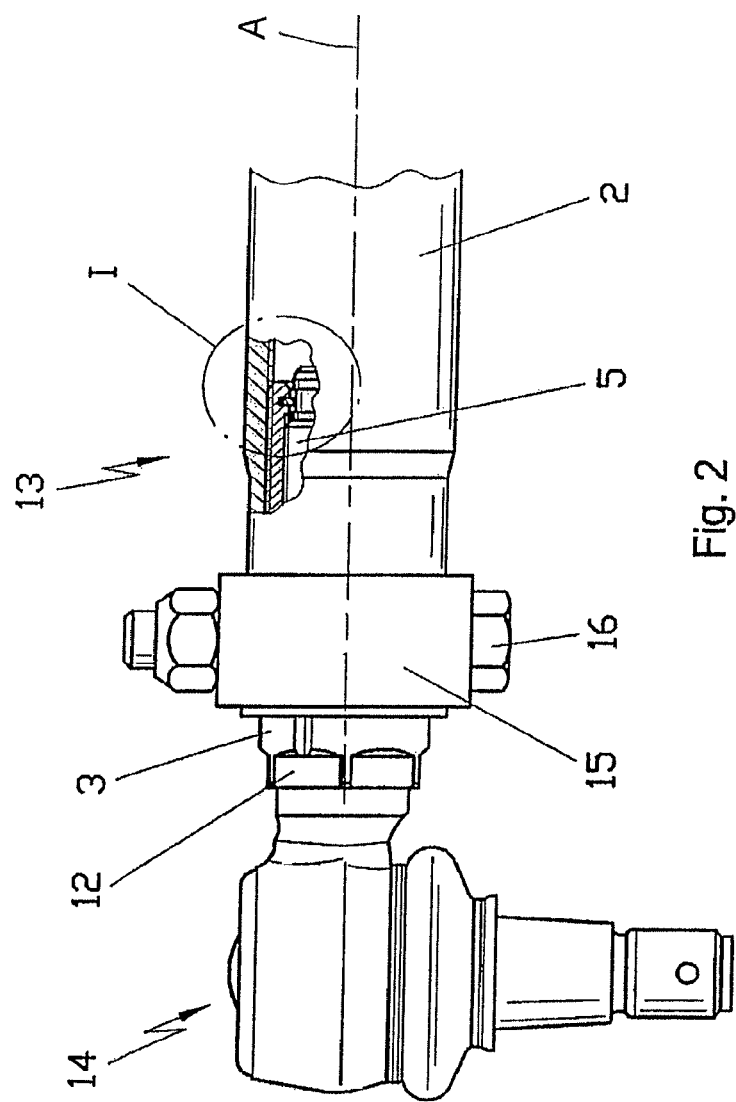
FIG. 2: an end piece of a tie rod with a structural unit according to the invention.

For improved understanding of the solution according to the invention, a structural unit of a tie rod 13 for a motor vehicle is shown in FIG. 2 as an example. The tie rod 13, of which only an end piece is shown, has a tube 2 into which the adjustment sleeve 3 is screwed. A key surface 12 is present on its outer lateral surface for adjusting the adjustment sleeve 3. A ball joint 14 with the adjustment sleeve 3 is connected to the shank 5 forming a ball joint housing shank. A collar clamp 15 which is placed on the outer lateral surface of the tube 2 serves for fixing the components to each other. This collar clamp 15 is tightened by means of a threaded connection 16 and therefore braces the structural unit as a whole. Therefore, an adjustment movement is no longer possible after tightening the collar clamp. As is evident from the representation in FIG. 2, the structural unit according to the invention is located within the tube 2 of the represented tie rod 13, whereby it is protected from contamination and mechanical damage.

LIST OF REFERENCE CHARACTERS 1 internal thread (tube)
2 tube
3 adjustment sleeve
4 internal thread (adjustment sleeve)
5 shank
6 blocking element
7 groove (in the shank)
8 inner lateral surface (of the adjustment sleeve)
9 groove (in the adjustment sleeve)
10 through opening (of the blocking element)
11 end piece
12 key surface
13 tie rod
14 ball joint
15 collar clamp
16 threaded connection
17 outer thread (of the adjustment sleeve)
18 outer thread (of the shank)
19 stopping flange
20 stopping

The invention claimed is:

1. A structural unit comprising:
a cylindrical tube (2) having a first end with an internal thread (1) which is one of a right-hand thread and a left-hand thread, an adjustment sleeve (3) being screwed into the first end of the cylindrical tube,
the adjustment sleeve (3) having an internal thread (4) which is the other one of the right-hand thread and the left-hand thread, and a shank being screwed into the adjustment sleeve,
a blocking element (6) is received by the adjustment sleeve such that the blocking element and the adjustment sleeve are axially fixed relative to each other, the shank has an outer lateral surface with a groove, the blocking element is elastically flexible from a contracted condition to an expanded condition, such that in a locked position of the blocking element, the blocking element is in the contracted condition and is received within and abuts a lateral inner surface of the groove of the shank, the blocking element in the locked position is received within a groove of the adjustment sleeve and is spaced from a radially inward facing surface of the groove of the adjustment sleeve, when the blocking element is in the locked condition the shank is both rotatable and axially slidable with respect to the adjustment sleeve.

2. The structural unit according to claim 1, wherein the groove (7) of the shank is an annular groove that is formed circumferentially about the outer lateral surface of the shank (5).

3. The structural unit according to claim 2, wherein the blocking element (6) is received within the groove (9) that is formed on an inner lateral surface (8) of the adjustment sleeve (3), in the expanded condition of the blocking element, the blocking element is spaced from the lateral inner surface of the groove of the shank.

4. The structural unit according to claim 3, wherein the blocking element (6) is radially sized such that in the contracted condition, a radially outward facing surface of the blocking element is spaced from the radially inward facing surface of the groove (9) of the adjustment sleeve and a radially inward facing surface of the blocking element abuts the lateral inner surface of the groove of the shank, the groove of the shank is axially defined by two axially opposite bearing flanges and the blocking element is axially slidable within the annular groove of the shank such that the blocking element abuts only one of the two axially opposite bearing flanges at a time.

5. The structural unit according to claim 4, wherein the shank (5) has a mushroom-cap-shaped end piece (11), and in the expanded condition of the blocking element, the radially outward facing surface of the blocking element abuts the radially inward facing surface of the groove of the adjustment sleeve, and the radially inward facing surface of the blocking element has a radius that is larger than a radius of the outer lateral surface of the shank.

6. The structural unit according to claim 5, wherein the end piece (11) of the shank (5) is received within the adjustable sleeve and has a one of a spherical, a conical and a tapered contour.

7. The structural unit according to claim 1, wherein the blocking element (6) has radially inward and radially outward facing surfaces, and the radially inward facing surface of the blocking element defines a through opening, and when in the contracted condition, the radially inward facing surface of the blocking element abuts the lateral inner surface of the groove of the shank and the radially outward facing surface of the blocking element has a radius that is greater than a radius of the outer lateral surface of the shank and, in the expanded condition, the inner surface of the blocking element has a radius that is greater than the radius of the outer lateral surface of the shank.

8. The structural unit according to claim 1, wherein the blocking element (6) has an axial dimension that is smaller than an axial distance from one axially facing surface of the groove (7) of the shank (5) to an opposite axially facing surface of the groove of the shank such that when the blocking element in the locked position, the shank is rotatable and axially slidable with respect to the adjustment sleeve over an axial adjustment distance.

9. The structural unit according to claim 1, wherein an axial end of the adjustment sleeve (3), extending out of the tube (2), has a key surface (12) for attaching a tool thereto.

10. The structural unit according to claim 1, wherein the structural unit is a component of a tie rod (13) of a motor vehicle, and the shank (5) is an end of a ball joint housing shank of the tie rod (13).

11. A structural unit comprising:
- a tube (2) having a first end with an internal thread (1) that is one of a right-hand thread and a left-hand thread;
- an adjustment sleeve (3) having an external thread (17) which mates with the internal thread of the tube (2) such that the adjustment sleeve (3) axially slides toward the first end of the tube (2) when the adjustment sleeve rotates with respect to the tube, and the adjustment sleeve (3) having an internal thread (4) that is the other one of the right-hand thread and the left-hand thread, and the adjustment sleeve (3) comprising an internal annular groove (9) that has a radially inward facing surface and which receives a blocking element (6), the blocking element abutting opposite axial sides of the internal annular groove of the adjustment sleeve such that the blocking element and the adjustment sleeve are axially fixed with respect to each other; and
- a shank (5) having an external thread (18) mating with the internal thread (4) of the adjustment sleeve (3),
- the shank (5) has an outer lateral surface comprising an external annular groove (7) which receives the blocking element (6) of the adjustment sleeve, the shank has two stop flanges which form axially opposite sides of the external annular groove of the shank, the blocking element being axially slidable within the external annular groove of the shank between a first position, in which the blocking element abuts a first of the two stop flanges, and a second position, in which the blocking element abuts a second of the two stop flanges,
- the first and the second positions of the blocking element are axially spaced from each other such that when the blocking element is received within the internal annular groove of the adjustment sleeve and within the external annular groove of the shank, the shank and the adjustment sleeve are rotatable and axially slidable with respect to each other,
- the blocking element has radially inward and radially outward facing surfaces and is radially elastic such that in a contracted condition of the blocking element, the radially inward facing surface of the blocking element abuts a lateral inner surface of the external annular groove of the shank and the radially outward facing surface of the blocking element is spaced from the radially inward facing surface of the internal annular groove of the adjustment sleeve, and in an expanded condition of the blocking element, the radially inward facing surface of the blocking element has a radial extent that is greater than a radius of the outer lateral surface of the shank.

* * * * *